March 27, 1945.  J. R. PENISTEN  2,372,338
HYDROGEN FLUORIDE ALKYLATION PROCESS
Filed June 27, 1942
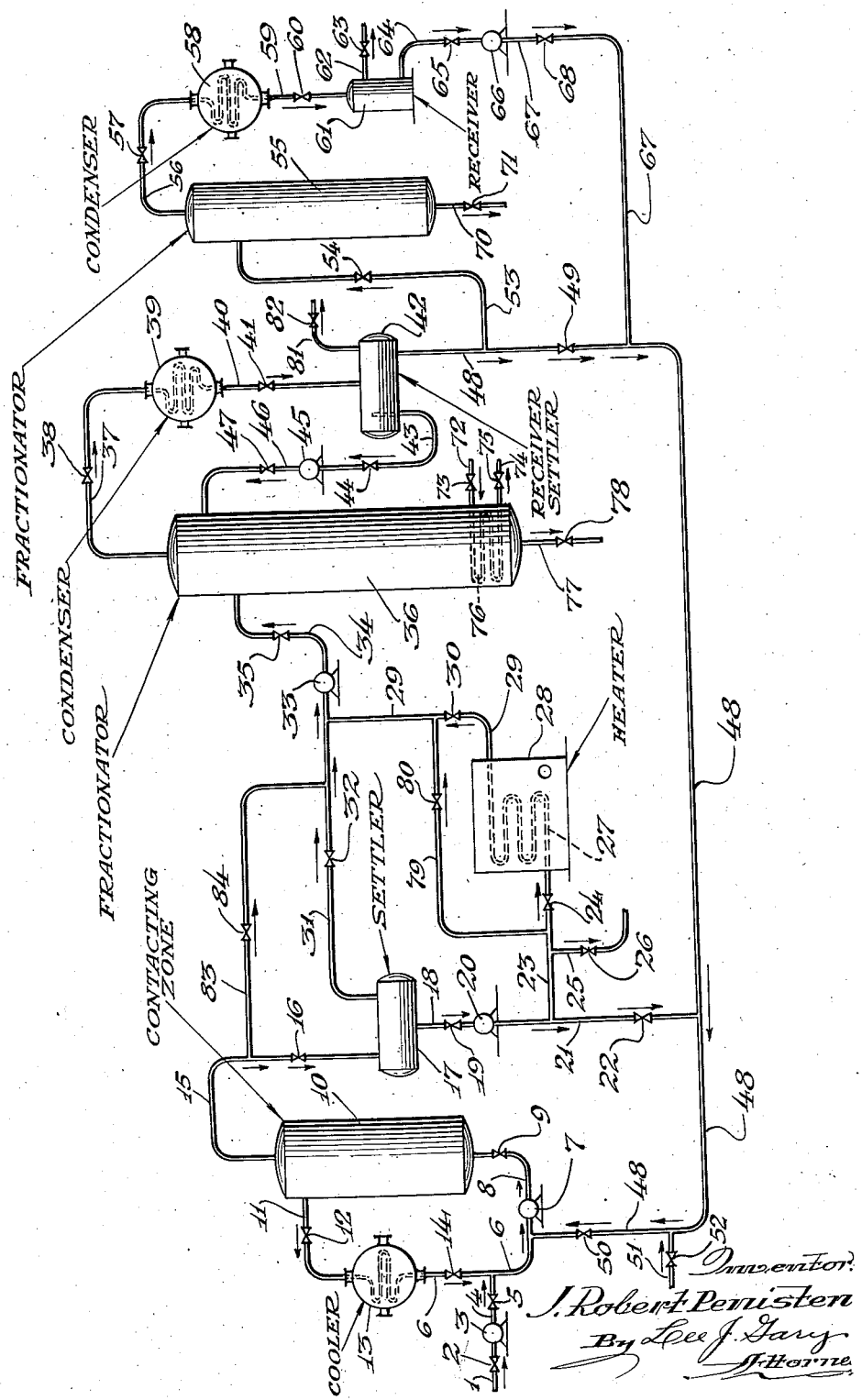

Patented Mar. 27, 1945

2,372,338

UNITED STATES PATENT OFFICE 2,372,338

HYDROGEN FLUORIDE ALKYLATION PROCESS

J Robert Penisten, Chicago, Ill., assignor to Universal Oil Products Company, Chicago, Ill., a corporation of Delaware Application June 27, 1942, Serial No. 448,760

2 Claims. (Cl. 260—683.4)

This invention is concerned with improvements in the alkylation of hydrocarbons in the presence of a hydrogen fluoride catalyst and is more particularly related to the alkylation of isoparaffins with olefins.

The reaction of isoparaffins with olefins to form higher molecular weight branched chain hydrocarbons is a valuable method for the production of high antiknock motor fuels or blending stocks which are suitable for aviation purposes. Hydrogen fluoride catalysts are especially useful in the alkylation of isoparaffins with olefins because of the fact that undesirable side reactions, e. g., oxidation and sulfonation which are prevalent when sulfuric acid catalyst is employed, do not occur to any appreciable extent. Furthermore as described hereinafter in greater detail, the hydrogen fluoride catalysts are capable of being regenerated, and purified hydrogen fluoride may be recovered for reuse in the process. Hydrogen fluoride which is dissolved in the hydrocarbon reaction products may also be recovered and returned to the process.

In the usual method of alkylating isoparaffins with olefins in the presence of a hydrogen fluoride catalyst, the reactants and catalyst are subjected to intimate contact in an alkylation zone under substantially liquid phase conditions, and the reaction mixture is introduced into a settling zone wherein the used hydrogen fluoride catalyst may be separated from the hydrocarbon reaction products. In the present invention, important improvements have been incorporated in the process whereby hydrogen fluoride dissolved in the hydrocarbon reaction products may be recovered and purified hydrogen fluoride catalyst having a higher effective hydrogen fluoride concentration may be recovered from the used hydrogen fluoride catalyst in a common recovery step.

In one specific embodiment the invention comprises reacting isoparaffins and olefins under alkylating conditions in the presence of a hydrogen fluoride catalyst, separating the hydrocarbon reaction products from used hydrogen fluoride catalyst, returning a portion of said separated used hydrogen fluoride catalyst to the alkylation zone, subjecting the hydrocarbon reaction products to fractionation for the recovery of dissolved hydrogen fluoride, introducing used hydrogen fluoride catalyst into said fractionation step whereby purified hydrogen fluoride is recovered from the used catalyst in common with the hydrogen fluoride recovered from solution in the hydrocarbon reaction products, and returning to the alkylation zone hydrogen fluoride recovered in said fractionation step.

Hydrogen fluoride is slightly soluble in hydrocarbons, and the hydrocarbon reaction products from the alkylation zone will usually contain a small amount, ordinarily not in excess of about 1%, of dissolved hydrogen fluoride. In order to improve the economic attractiveness of the process and also to avoid any possible health hazard or corrosion problem in the subsequent fractionation or other treatment of the hydrocarbon reaction products, it is desirable that this free hydrogen fluoride be removed. This is readily accomplished by subjecting the hydrocarbons to a fractional distillation step wherein a high external reflux ratio is employed. Light hydrocarbons such as propane and/or butane are vaporized and hydrogen fluoride is carried overhead with the hydrocarbon vapors. The overhead mixture is condensed and passed to a receiver or settling zone wherein the excess hydrogen fluoride separates out as a lower layer and the upper hydrocarbon layer which may be substantially saturated with hydrogen fluoride is returned in toto to the fractionating column as reflux. The recovered hydrogen fluoride may then be returned to the alkylation zone.

The boiling point of hydrogen fluoride is higher than the boiling point of either butane or propane. Therefore, in order to effect the removal of hydrogen fluoride in this manner, it is necessary to vaporize a relatively large quantity of hydrocarbons to provide the required "stripping" action. If insufficient quantities of lower boiling hydrocarbons are present in the reaction products, or if for other reasons it appears desirable, the hydrogen fluoride may be removed by vaporizing, condensing, and refluxing higher boiling hydrocarbons.

After a substantial period of use the hydrogen fluoride catalyst tends to decline in alkylating activity. This decrease in activity is generally attributable to the excessive accumulation of organic material in the catalyst and to dilution with water. Hydrogen fluoride being a highly hygroscopic substance will often retain substantial quantities of water during its use even through precautions are taken to minimize the entry of water into the system, e. g. by drying the charging stock, etc. The organic material which accumulates in the hydrogen fluoride catalyst comprises essentially heavy hydrocarbons of a polymer-like nature although fluorine-containing complexes or loose chemical combinations may also be present. A portion of the used hydrogen fluoride catalyst is ordinarily subjected to an external regeneration step by heating and distillation whereby purified hydrogen fluoride, which may also contain water and light hydrocarbons, is recovered from a residue of heavier organic material.

By the improved method of my invention, a substantial reduction may be effected in the amount of used catalyst which must be regenerated in the external regeneration step. Moreover, in many cases it may be possible to eliminate entirely the external regeneration step. The improvement comprises introducing a portion of the used hydrogen fluoride catalyst, with or without prior heating directly into the same fractionating zone wherein the hydrocarbon reaction products are fractionated or "stripped" for the recovery of dissolved hydrogen fluoride. In a single recovery step it is, therefore, possible to effect (1) the removal of dissolved hydrogen fluorode from the hydrocarbon reaction products, and (2) the regeneration of used hydrogen fluoride catalyst.

In the accompanying drawing is shown a diagrammatic illustration of one specific form of apparatus embodying the features of my invention.

A hydrocarbon charging stock which, for example, may comprise a butane-butylene mixture containing substantial quantities of isobutane is introduced through line 1 containing valve 2 to pump 3. This pump discharges through line 4 and valve 5 into line 6 of the emulsion recirculating system. Hydrogen fluoride catalyst obtained as hereinafter described is also introduced by means of line 48 and valve 50 into line 6. The mixture of hydrocarbon reactants and catalyst passes through pump 7 and line 8 containing valve 9 into contacting zone 10. This zone may comprise any convenient apparatus or arrangement of equipment wherein intimate contact is effected between the hydrocarbon reactants and the hydrogen fluoride catalyst. For example, a mechanically agitated mixing zone may be employed or a so-called time tank containing a plurality of orifices or baffles may be utilized. The contacting zone is ordinarily operated under sufficient pressure so that the hydrocarbons and catalyst are substantially in the liquid phase. In the present embodiment a portion of the total reaction mixture or emulsion is withdrawn through line 11 and valve 12 and is passed through cooler 13 whereby the reaction temperature may be controlled. The cooled mixture is recirculated through line 6 and valve 14, pump 7, and line 8 containing valve 9.

A portion of the reaction mixture is continuously removed from the contacting zone through line 15 and valve 16 to settler 17. Here the emulsion is allowed to settle out into an upper hydrocarbon layer and a lower catalyst layer. A substantial portion of the used catalyst is withdrawn through line 18 and valve 19 and is passed by means of pump 20 through line 21 containing valve 22 and line 48 containing valve 50 to line 6 of the emulsion recirculating system. The upper hydrocarbon layer passes through line 31 containing valve 32 and is introduced by means of pump 33 through line 34 containing valve 35 into fractionating zone 36.

If desired, a portion of the used hydrogen fluoride catalyst may be withdrawn from the system, for example, through line 18 containing valve 19, pump 20, line 21, line 23 and line 25 containing valve 26. This used catalyst may then be introduced into an external regeneration zone and the purified hydrogen fluoride from said zone may be returned to the alkylating zone. However, in my invention a substantial portion of the used catalyst to be regenerated, instead of being withdrawn through line 25 and valve 26, is directed through line 23 and valve 24 to heating coil 27 disposed in heater 28 and the heated mixture is passed through line 29 and valve 30 into line 31 wherein it is commingled with the hydrocarbon charge to fractionating column 36. In many cases it may be desirable to install a cooler in line 29 in order to reduce the temperature of the stream from heater 28 before commingling with the hydrocarbons in line 31. It is the purpose of the heating zone to break up the organic complexes or fluorine-containing materials present in the used catalyst and thus to release hydrogen fluoride which may then be recovered in fractionating column 36. Under certain conditions it may be desirable to omit the heating step in which case the used catalyst stream passes from line 23 through line 79 containing valve 80 to line 29. It will also be apparent that heater 28 may comprise either an open-fired heater or any convenient form of heat exchange equipment.

Another method of introducing used catalyst into fractionator 36 consists of passing a portion of the entire reaction mixture or emulsion through line 83 and valve 84 directly into line 31 wherein it is commingled with the hydrocarbon layer from settler 17 and thus passes to the fractionating zone. If desired, heating means, not shown, may be employed in line 83.

In fractionator 36 a sufficient quantity of hydrocarbons is continuously vaporized to effect the removal overhead of hydrogen fluoride along with the hydrocarbon vapors. The overhead stream passes through line 37 and valve 38 to condenser 39. The condensate passes through line 40 containing valve 41 to receiver-settler zone 42. In the latter zone an upper hydrocarbon layer is returned continuously to the fractionating zone as reflux by means of line 43 containing valve 44, pump 45, and line 46 containing valve 47. If desired, the hydrocarbon reflux may be returned by means, not shown, to line 31 on the suction side of pump 33 which charges hydrocarbon feed to the column. The hydrogen fluoride may be withdrawn through line 48 and valve 49 and thus returned through valve 50 to line 6 of the emulsion recirculating system. If desired, uncondensed light gases may be removed from the system through line 81 containing valve 82. Heat may be supplied to fractionator 36 by means of steam introduced through line 72 and valve 73 into heating coil 76 and condensate may be withdrawn through line 74 containing valve 75.

A product substantially devoid of free or dissolved hydrogen fluoride is withdrawn from fractionator 36 through line 77 and valve 78. This product will comprise in this case essentially alkylate, normal butane, unconverted isobutane, and the residual organic contaminants left after the separation of purified hydrogen fluoride from the used catalyst. Additional fractionation steps, not shown, may be employed for the separation of normal and isobutane and the recovery of an aviation quality alkylate product. A heavy alkylate product is also obtained which may be separated from the heavier organic constituents of the used catalyst by further fractionation. The separated unconverted isobutane is preferably recycled to the alkylation zone. Treating steps may be provided at any point for the removal of small amounts of combined fluorine which may be present in the products.

In the event that the purified hydrogen fluoride which is separated from the used catalyst in fractionation zone 36 contains substantial quantities of water, it may be desirable to subject all or a portion of the recovered hydrogen fluoride to dehydration which may be effected by an additional fractionation step. Under such circumstances a portion of the recovered hydrogen fluoride is diverted through line 53 and valve 54 to fractionator 55 which will usually be of relatively small dimensions and may be constructed of corrosion resistant materials. In fractionator 55 a substantially anhydrous hydrogen fluoride product is taken overhead through line 56 and valve 57 to condenser 58. The condensed stream passes through line 59 containing valve 60 to receiver 61. Any condensable gases which may be present are vented through line 62 and valve 63. The anhydrous hydrogen fluoride is returned to the system by means of line 64 containing valve 65, pump 66 and line 67 containing valve 68. A reflux condensate comprising hydrogen fluoride and water is withdrawn through line 70 and valve 71. This mixture may be the constant boiling mixture containing about 35 to 40% hydrogen fluoride or it may be a mixture of higher hydrogen fluoride content. The combined stream of recovered and dried hydrogen fluoride then passes through line 48 and valve 50 to the alkylating system as previously described. Fresh hydrogen fluoride may be introduced to the system through line 51 and valve 52 to compensate for mechanical losses, etc. If desired, the "dehydration" column 55 may be supplied with reflux from line 67 by well-known means, not shown.

By the term "hydrogen fluoride catalyst" which is used throughout this specification and appended claims, it is intended to include catalysts wherein hydrogen fluoride is the essential active ingredient. Thus it is within the scope of my invention to employ catalysts containing relatively minor amounts of other materials in addition to hydrogen fluoride. For example, the hydrogen fluoride catalyst may contain appreciable quantities of water. While ordinarily commercial "anhydrous" hydrogen fluoride will be charged to the alkylation system, it is possible to have as high as about 10 to 15% water present in the catalyst. Excessive dilution with water, however, is undesirable since it tends to reduce the alkylating activity of the catalyst. Other substances such as boron trifluoride which may promote the catalytic activity of hydrogen fluoride in alkylation reactions may also be present.

The alkylation of isoparaffins with olefins in the presence of a hydrogen fluoride catalyst may be conducted at a temperature of from about 0° F. to about 200° F. although the reaction temperature is preferably and more conveniently held within the range of from about 50° F. to about 150° F. The pressure on the alkylation system is ordinarily just high enough to insure that the hydrocarbons and catalyst are substantially in the liquid phase. The reaction may be subjected to further control by means of the space time which is defined as the volume of catalyst within the contacting zone divided by the volume rate per minute of hydrocarbon reactants charged to the zone. Usually the space time will lie within the range of from about 5 to about 80 minutes, although this range may in certain cases be extended in either direction. As is well-known in the alkylation art it is preferable to maintain at all times a substantial molar excess of isoparaffins over olefins in the alkylation zone, e. g., from 4:1 to 10:1 or even higher.

The alkylation of isoparaffins with olefins utilizing hydrogen fluoride catalysts is particularly important in the case of the alkylation of isobutane with normally gaseous olefins such as propylene or butylene which are readily available in substantial quantities from ordinary refining sources. However, the process may also be applied to normally liquid isoparaffins and normally liquid olefins. It is also possible to employ mixtures of the normally liquid and normally gaseous hydrocarbons as reactants.

As a specific example of the results which may be obtained by my invention, the following operation is described but it is by no means intended that the scope of the invention be limited thereby.

A hydrogen fluoride alkylation system is employed which comprises essentially a mechanically agitated contacting zone, a settling zone, a fractionation zone for the recovery of hydrogen fluoride, and additional fractionation equipment for the recovery of unconverted isobutane and an alkylate product of the desired boiling range. This equipment is connected in essentially the manner shown in the drawing. The hydrocarbon charging stock utilized in the operation has the following molal composition: 1% $C_3$ and lighter hydrocarbons, 40% isobutane, 30% normal butane, 11% isobutylene, and 18% normal butylene.

A reaction temperature of 100° F. is maintained in the contacting zone by means of internal cooling coils and the hydrocarbons and hydrogen fluoride catalyst are maintained in substantially the liquid phase under a pressure of 165 pounds per square inch gauge. With the aid of recycled unconverted isobutane, a molar isoparaffin to olefin ratio of 6:1 is maintained in the contacting zone. A catalyst to hydrocarbon ratio of 1.5 to 1 on a volume basis is also maintained in the contacting zone.

In the settling zone an upper hydrocarbon layer is withdrawn at approximately 100° F. and 165 pounds per square inch gauge and is charged to the first fractionation zone or hydrogen fluoride "stripper" for the recovery of dissolved hydrogen fluoride. A lower used catalyst layer is withdrawn from the settler and a major portion thereof is recycled to the contacting zone for reuse. A portion of the lower used catalyst layer, however, is directed to a heating zone wherein the used catalyst is maintained at 375° F. and 175 pounds per square inch gauge for a time sufficient to break down the hydrocarbon-catalyst complexes and thereby release purified hydrogen fluoride. The effluent mixture from this heating zone is cooled to approximately 100° F. and the pressure is decreased to approximately 165 pounds per square inch gauge, and the stream is commingled with the hydrocarbon reaction product stream from the settling zone. The commingled streams are thus introduced into the first fractionation step wherein not only the dissolved hydrogen fluoride in the hydrocarbon reaction product stream but also the purified hydrogen fluoride released from the used catalyst is recovered in the overhead stream from the fractionation zone. This fractionation step is operated at a pressure of 300 pounds per square inch gauge with a top temperature of approximately 185° F. and a reboiler temperature of 240° F.

The overhead stream from the fractionating column is condensed and passed to a receiver substantially as shown in the drawing and the upper hydrocarbon layer may be returned to the fractionating column as external reflux. The lower hydrogen fluoride layer is returned to the alkylation system and a portion thereof may first be subjected to a drying step by fractional distillation if this is deemed desirable.

The portion of the used catalyst stream from the settler which is directed to the hydrogen fluoride recovery step in order to effect regeneration of the catalyst and maintain the catalyst activity at a suitably high level will depend upon many factors, but in general a volume ratio of catalyst regenerated to alkylate produced of approximately 1:10 will be sufficiently high to accomplish the desired degree of regeneration. The bottom product from the hydrogen fluoride recovery step may then be subjected to additional fractionation steps for the separation of unconverted isobutane, aviation quality alkylate, heavy alkylate, and the organic residue left over from regeneration of the used catalyst.

I claim as my invention:

1. In the conversion of hydrocarbons in the presence of hydrogen fluoride catalyst wherein a hydrocarbon mixture containing dissolved hydrogen fluoride is separated from used catalyst containing hydrocarbon-fluorine complexes, the method which comprises heating at least a portion of said used hydrogen fluoride catalyst sufficiently to decompose and release hydrogen fluoride from said complexes, introducing the thus treated used catalyst and said hydrocarbon mixture into a fractionating zone, vaporizing hydrogen fluoride and hydrocarbons from the commingled materials in said zone while refluxing the vapors with hydrocarbon components of said mixture to separate hydrogen fluoride as a vapor from higher boiling hydrocarbons in the form of liquid, removing hydrogen fluoride-containing vapor from the upper portion of the fractionating zone and removing hydrocarbon liquid from the lower portion of said zone.

2. In the conversion of hydrocarbons in the presence of hydrogen fluoride catalyst wherein a hydrocarbon mixture containing dissolved hydrogen fluoride is separated from used catalyst containing hydrocarbon-fluorine complexes, the method which comprises heating at least a portion of said used hydrogen fluoride catalyst sufficiently to decompose and release hydrogen fluoride from said complexes, introducing the thus treated used catalyst and said hydrocarbon mixture into a fractionating zone, vaporizing hydrogen fluoride and hydrocarbons from the commingled materials in said zone while refluxing the vapors with hydrocarbon components of said mixture, removing from the upper portion of said zone a vaporous mixture of hydrogen fluoride and hydrocarbons, removing hydrocarbon liquid from the lower portion of said zone, condensing said vaporous mixture and separating resultant liquid hydrogen fluoride from hydrocarbon condensate, and returning the latter to the fractionating zone as refluxing medium therein.

J ROBERT PENISTEN.